No. 693,476.  
W. H. WILDER.  
WICK TUBE.  
(Application filed Feb. 14, 1900.)  
Patented Feb. 18, 1902.
(No Model.)
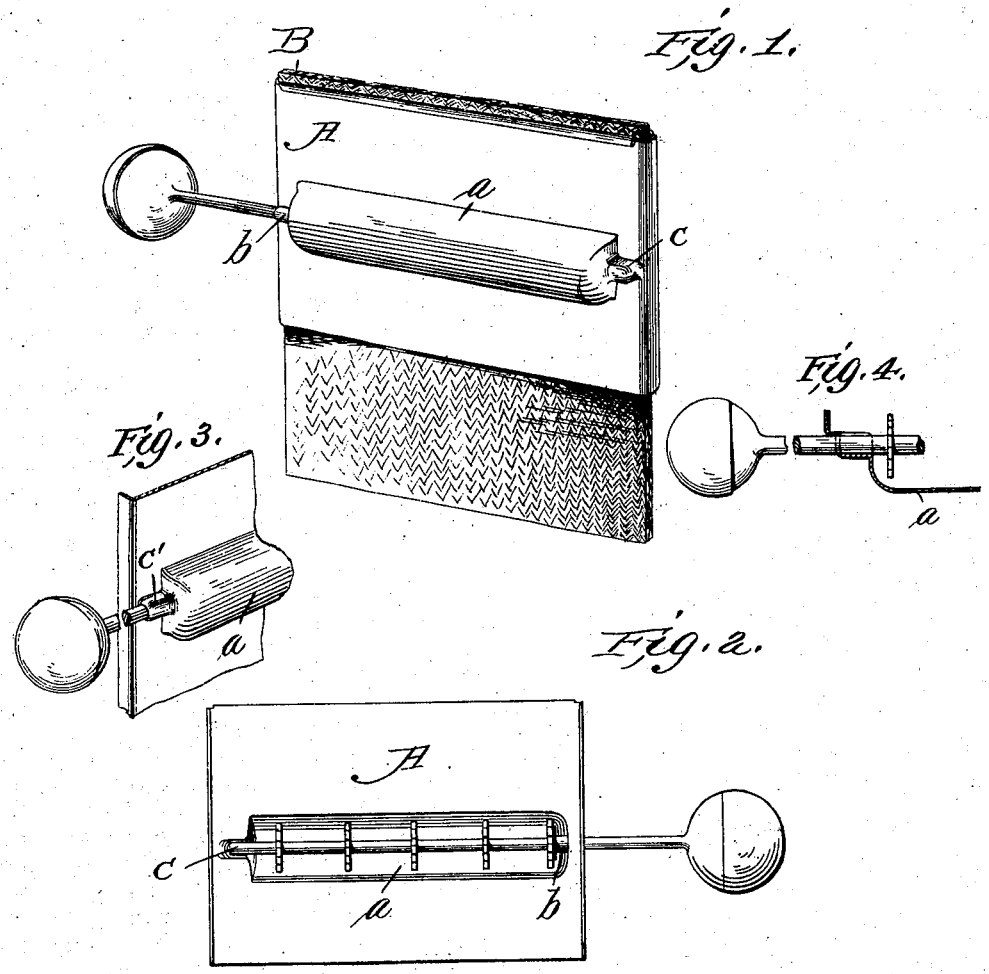
Attest  
R. E. Durand.  
Inventor  
Wm. H. Wilder  
by Walter Donaldson  
Attys

UNITED STATES PATENT OFFICE.

WILLIAM H. WILDER, OF GARDNER, MASSACHUSETTS.

WICK-TUBE.

SPECIFICATION forming part of Letters Patent No. 693,476, dated February 18, 1902.

Application filed February 14, 1900. Serial No. 5,169. (No model.)

*To all whom it may concern:*

Be it known that I, WILLIAM H. WILDER, a citizen of the United States, residing at Gardner, Worcester county, Massachusetts, have invented certain new and useful Improvements in Wick-Tubes, of which the following is a specification.

My invention relates to wick-raisers for flat-wick tubes, and is designed to economize the manufacture.

Heretofore in the manufacture of flat-wick tubes the tube has been made out of two pieces, one furnishing the plain wall of the tube and the other being provided with a drawn or swaged housing for the wick-raising spindle, and in order to provide a seat for the end of the spindle a bushing has been used of a separate piece of metal, and this bushing has been fitted to an opening formed in the end of the housing, being secured in place by soldering. It is not only expensive to make this separate piece and place it in position, but it frequently causes a leak and is generally objectionable, as the spindle sticks or is difficult to turn. I have aimed to overcome this and while avoiding the expense of a separate piece to absolutely prevent all danger of leakage by forming the seat for the end of the spindle by swaging out the metal at the end of the housing, so that the housing and the seat are in one piece with the wall of the wick-tube and but one operation is required to complete both.

In the accompanying drawings, Figure 1 shows a perspective view of a wick-tube embodying my invention, and Fig. 2 is a view of one side of the wick-tube with the wick and the opposite side removed. Figs. 3 and 4 show in perspective and section the opposite end of the housing formed in like manner.

The wick-tube may be of any ordinary construction, and I have shown the invention as applied to a flat-wick tube made up of two halves A B, secured together at the ends, the half A containing the housing $a$, which is of ordinary construction and is adapted to cover the spindle of the wick-raiser and the serrated disks carried thereby and adapted to engage the wick for raising the same. This housing is in one piece with the part A of the wick-tube and is ordinarily swaged out to form the housing. As has been stated, it is usual to provide a bushing at each end of the housing to serve as a bearing for the spindle ends of the wick-raiser, and while, as shown in Figs. 1 and 2, I may still use the bushing nearest to the handle of the wick-raiser, as shown at $b$, I entirely dispense with the bushing at the other end of the spindle and swage out a recess, as shown at $c$, of the proper size to receive the outer end of the spindle, as shown in Fig. 2, and this has the advantage of not only rendering unnecessary the making and fitting of a separate piece, but it prevents all danger of leakage at this point and a better bearing is provided for the end of the spindle, as there is no danger of the spindle binding, as when a bushing is used. It will be observed that the bearing formed by the recess $c$ is integral with the housing and extends from the end thereof, forming a reduced continuation of the same. I may also in like manner provide a similar bearing for the opposite or inner part of the spindle, as shown in Figs. 3 and 4. Here, as shown at $c'$, I swage out the metal to provide a bearing for the spindle, this bearing being in line with the wall of the opening through which the spindle passes, so that it takes all the pressure and none comes upon the edge of the opening.

By my improvement the cost of manufacturing is reduced, and while this is small when considered in connection with a single wick-tube it means a very considerable saving when the great number of wick-tubes manufactured is considered.

Another advantage is derived from the use of my invention, and that is that it provides an elongated or broad bearing-surface for the spindle instead of simply the edge of an opening, as is usual in many cases where the spindle passes through simple openings in the ends of the housings. These openings in such cases soon grow larger under the constant action of the spindle and leak, causing the spindle to gum and stick, and it frequently happens that gas escapes at these enlarged openings. This is obviated by making the bearing broad or elongated, and there is no tendency to stick, as the broad bearing does not completely encircle the spindle, but is open toward the wick-space. The contact with the wick prevents the displacement of the spindle at its outer extremity with the recess c, into which it fits.

What I claim is—

1. In a wick-tube, a housing adapted to contain the spindle of a wick-raiser and an elongated bearing extending longitudinally at the end of said housing and integral therewith and having a U-shaped recess with a closed end and an open side toward the wick-space, substantially as described.

2. In a wick-tube, a housing adapted to contain the spindle of a wick-raiser and having partial bearings for the spindle located within the wick-tube and integral with the housing forming an elongated surface adapted to receive the pressure from one side of the spindle only, the opposite side being open to the wick-space, thus preventing binding of the spindle, substantially as described.

3. In a wick-tube, a housing adapted to contain the spindle of the wick-raiser with a perforation in one end of the housing through which the spindle passes and a partial bearing along one side of said perforation for the spindle, said bearing being elongated and integral with the housing and open toward the wick-space, substantially as described.

In testimony whereof I affix my signature in presence of two witnesses.

WILLIAM H. WILDER.

Witnesses:
HERBERT D. BURNHAM,
CLIFFORD H. STOCKWELL.